United States Patent

Barnett

[11] Patent Number: 5,095,633
[45] Date of Patent: Mar. 17, 1992

[54] CEMENT BLOCK TOOL

[76] Inventor: Burl R. Barnett, 2800 Cordrey Dr., Escondido, Calif. 92029

[21] Appl. No.: 609,789

[22] Filed: Dec. 17, 1990

[51] Int. Cl.⁵ .............................. G01B 5/14
[52] U.S. Cl. ........................ 33/518; 33/404; 33/408
[58] Field of Search .............. 33/518, 404–408, 33/410

[56] References Cited

U.S. PATENT DOCUMENTS

| | | | |
|---|---|---|---|
| 915,982 | 3/1909 | Maddux | 33/518 |
| 2,523,101 | 9/1950 | Edixon | 33/408 |
| 2,543,716 | 2/1951 | Carini | 33/404 |
| 2,543,717 | 2/1951 | Carini | 33/518 |
| 2,623,289 | 12/1952 | Kampel | 33/406 |
| 2,665,487 | 1/1954 | Mastrella | 33/408 |
| 2,686,974 | 8/1954 | Lanner | |
| 2,881,532 | 4/1959 | Boykin | |
| 2,891,318 | 6/1959 | Harrison et al. | |
| 3,156,982 | 11/1964 | Wahlin | 33/408 |
| 3,174,227 | 3/1965 | House | 33/518 |
| 3,751,810 | 8/1973 | Valva | 33/410 |
| 4,408,398 | 10/1983 | Glaze | |

Primary Examiner—William A. Cuchlinski
Assistant Examiner—Alvin Wirthlin

[57] ABSTRACT

A mechanical device for laying a cement block upon a previously laid course consisting of two main body legs (7), (3), supporting a pivot arm and adjustable stop (4), (5), (6), for gauging a block to be laid and set in mortar in respect to a prior course maintaining accurate block-to-block head joint as well as layer-to-layer uniformity in respect to the first course.

4 Claims, 2 Drawing Sheets

CEMENT BLOCK TOOL

This invention relates to a masonry tool, specifically a fixture to aid in proper block alignment during construction of a block structure.

BACKGROUND OF THE INVENTION

To build up a masonry wall it is necessary to lay individual blocks by a hand operation one by one in a bed of mortar and to adjust each block in turn so that its position is in alignment and properly spaced from the next proceeding block together with the course of block beneath it. For a workman to keep the blocks level and of unfirm thickness, he had to rely on visual alignment and measurement which often produced an unprofessional looking result as there was formerly no convenient tool for this purpose.

SUMMARY OF THE INVENTION

It is the object of this invention to provide a new and improved fixture for laying up block walls or structures which provides uniform spacing of the joint separating one block from another based on the first course or model course laid.

Another object of this invention is to provide a new and improved gauge for laying of block structures which automatically determines the spacing based on the first or model course.

With these objects in view, this invention consists of the construction and combination of the various parts of the device serving as an example only of one or more embodiments of this invention whereby the objects contemplated are attained as hereinafter disclosed in the specification and drawing and pointed out in the appended claims.

This invention spaces the block for a second course by locating from the block on the first model course. This eliminates cumulative error buildup commonly created by unskilled or persons unaccustomed to this type of work. The first course should be considered the model and care should be taken to achieve the form whether it be a straight line structure or a curved wall structure. This invention will duplicate all subsequent courses from the model or first course.

DESCRIPTION OF THE PREFERRED EMBODIMENT

As stated previously, this invention locates a second or upper course from a previously laid row or model course of block. This block by design has an approximately 2 degree tapered web in the center. This invention is placed onto the tapered web and is self aligning and securing and provides a positive stop gauge for the next block to be laid on an upper course. By locating on the lower course for the upper course for a horizontal alignment eliminates cumulative error and duplicates upper courses from the lower courses previously laid.

Figure 1:
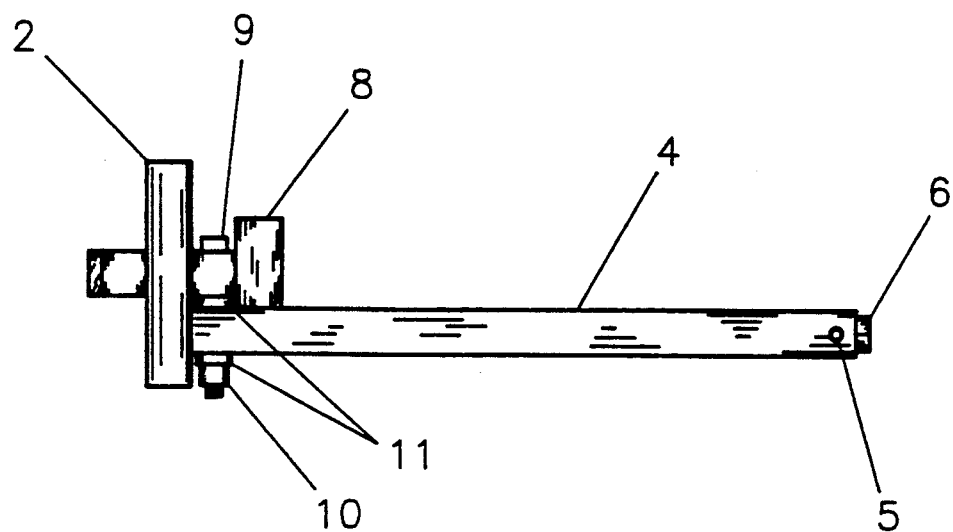
FIG. 1 is a top view made in accordance with the present invention.
Figure 2:
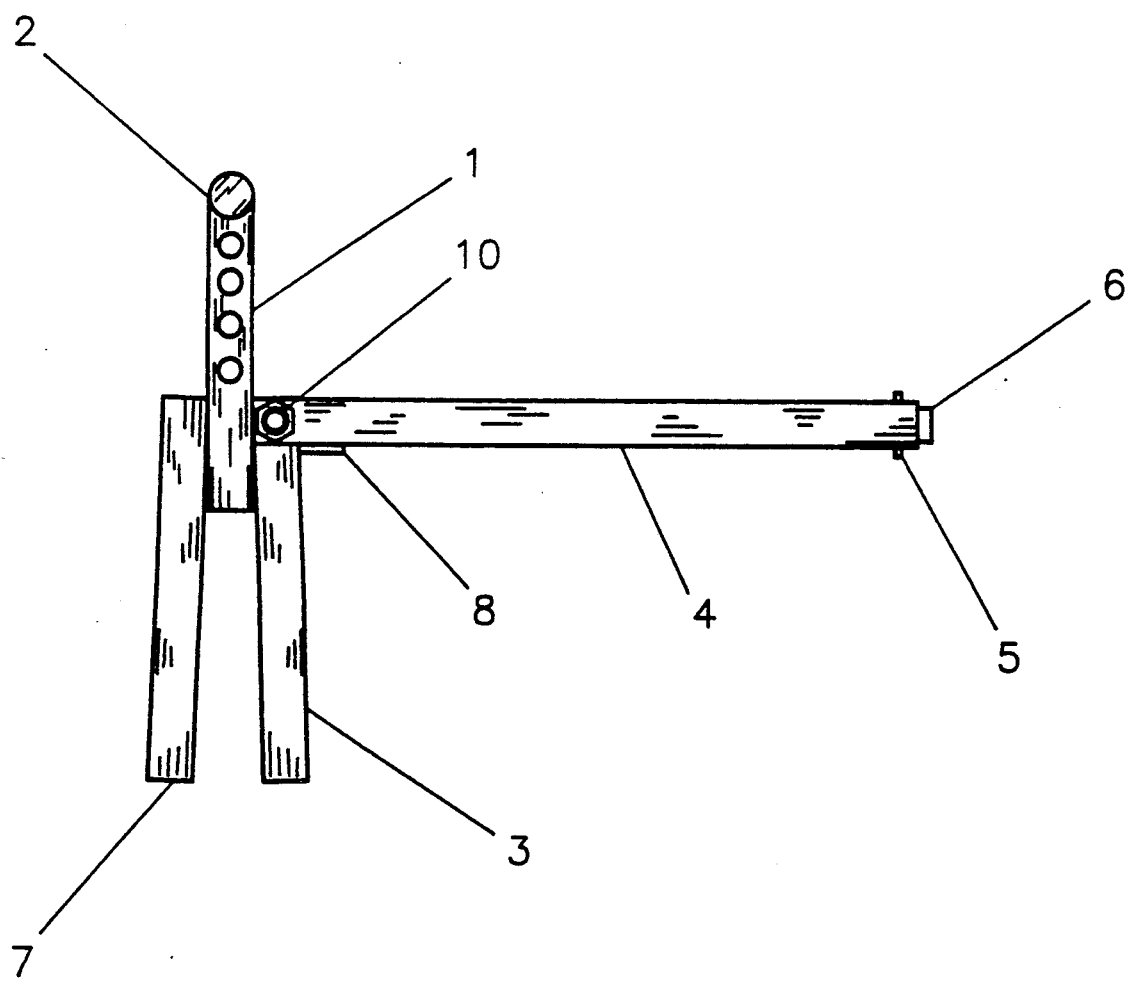
FIG. 2 is a side view made in accordance with the present invention.
Figure 3:
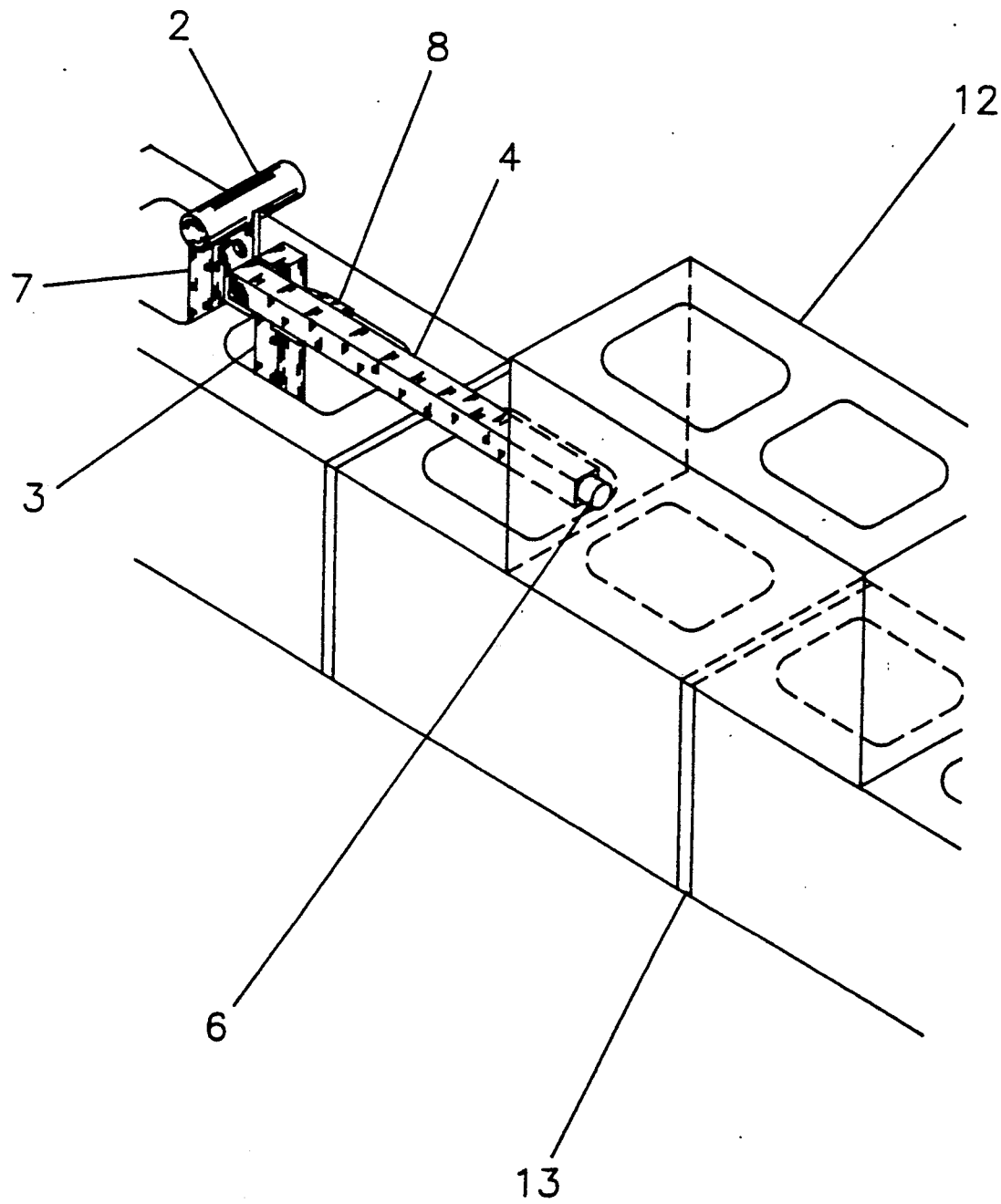
FIG. 3 is a perspective view showing the first blocks laid for the lower course of a wall structure.

The cement block tool comprises a main body spacing plate 1, main body leg 7 and 3 at approximately 1 degree taper from the center line of said main body as shown in FIG. 2 for example, which supports pivot arm 4 assembly and locking screw 5 and adjustable shaft 6.

The pivoting or rotating point is established in main body leg 3 for example only and may pivot or rotate from any portion of upper main body 7, 3 or 1.

Handle 2 is attached to main body spacing plate 1 by welding for example only.

Pivot rod 9 is a threaded bolt for example only and is attached through a drilled hole. Pivot rod 9 may be a pin, clevis, shaft or any rod device allowing pivot arm 4 to pivot or rotate from main body 7, 3 or 1.

Adjustable shaft 6 is a threaded rod attached to pivot arm 4 by a threaded surface and locking in position by locking screw 5. Locking screw 5 is a locked screw used to lock in position adjustable shaft 5.

Pivot rod lock/nut 10 is a neat self-locking to secure pivot arm 4 to pivot rod 9.

Pivot arm tension washers 11 are used to hold pivot arm 4 in desired position.

Pivot arm stop plate 8 is attached to pivot arm 4 by welding for example only and aligns pivot arm 4 for its referenced position.

The cement block tool is used as a positive stop for positioning cement blocks upon a previously laid course 13,14 by placing said tool onto the center web of a cement block from said course and pushing downward with said tool onto the center web of said block between main body legs 7 and 3 providing a locking and positioning action of said tool and positioning an adjustable locating surface on the pivot arm 4 for the locating of a block 12 to be laid and set into mortar. The drawing indicates a simple construction for a tool of this nature and may vary in manufacturing by rotating the pivot arm in degrees to index for curved wall construction or it may only include as drawn from calculating a radius into a straight line and calibrating the pivot arm to a specified length by adjusting rod 6.

The following is a list of typical material that could be used for a simple construction:
1. Main body spacing plate (1"×¼" cold roll steel).
2. Handle (1"×⅛" round stock)
3. Main body leg (1¼"×1¼"×0.062 square stock).
4. Pivot arm (1¼"×1¼"×62 square stock).
5. Locking screw (¼–20 allen screw).
6. Adjustable shaft (⅜–20 threaded rod).
7. Main body leg (1¼"×1¼"×0.062 square stock).
8. Pivot arm stop plate (1"×¼").
9. Pivot rod (¼"×20 bolt).
10. Pivot rod lock/nut (¼"–20 self locking nut).
11. Pivot arm tension washers (¼" compression washers).

All material used in this model is for reference only and other material may be substituted.

I claim:
1. A cement block locating device comprising:
   a main body comprising a spacing plate and a plurality of legs projecting downward, said legs being adapted to contact each side of a tapered center web of a cement block of a previously laid course for supporting said locating device, said legs being separated a predetermined distance by said spacing plate;
   said main body having a pivot arm attached thereto at a first end of said pivot arm;
   and a locating surface attached to a second end of said pivot arm for positioning a cement block on a sec- ond course with respect to the previously laid course.

2. A locating device according to claim 1, wherein said locating surface is adjustable along the axis of said pivot arm.

3. A method for laying block upon a previously laid course comprising:

provi ding a locating device having a main body with a spacing plate and a plurality of legs projecting downwardly therefrom, said legs being spaced a predetermined distance by said spacing plate, a pivot arm attached to said main body at one end of said pivot arm, and a locating surface attached to the other end of said pivot arm;

positioning said locating device on a tapered center web of a cement block of said previously laid course by placing said legs along either side of said web;

positioning said pivot arm above said previously laid course;

and placing a cement block on said previously laid course such that said cement block is in contact with said locating surface.

4. A method for laying block according to claim 3, wherein the step of positioning said pivot arm further includes adjusting said locating surface along the axis of said pivot arm.

* * * * *